United States Patent
Buck et al.

(10) Patent No.: US 6,867,775 B2
(45) Date of Patent: Mar. 15, 2005

(54) METHOD AND DEVICE FOR DISPLAYING A MULTIDIMENSIONAL IMAGE OF AN OBJECT

(75) Inventors: Matthias Buck, Neu-Ulm (DE); Walter Gillner, Ulm (DE); Helmut Jorke, Gerstetten (DE)

(73) Assignee: DaimlerChrysler AG, Ulm (DE)

( * ) Notice: Subject to any disclaimer, the term of this patent is extended or adjusted under 35 U.S.C. 154(b) by 196 days.

(21) Appl. No.: 09/778,404

(22) Filed: Feb. 7, 2001

(65) Prior Publication Data

US 2001/0043213 A1 Nov. 22, 2001

(30) Foreign Application Priority Data

Feb. 8, 2000 (DE) .......................................... 100 05 335

(51) Int. Cl.[7] .............................................. G06T 15/20
(52) U.S. Cl. ...................... 345/427; 345/426; 345/630; 348/157; 382/154
(58) Field of Search ................................ 345/419, 427, 345/8, 426, 9, 582, 630, 634; 348/157, 42, 51, 169, 45, 49, 53, 56; 382/154

(56) References Cited

U.S. PATENT DOCUMENTS

| | | | |
|---|---|---|---|
| 5,260,773 A | * | 11/1993 | Dischert ...................... 348/42 |
| 5,781,229 A | * | 7/1998 | Zediker et al. ............... 348/51 |
| 6,220,709 B1 | | 4/2001 | Heger ........................... 353/8 |
| 6,283,597 B1 | | 9/2001 | Jorke .......................... 353/31 |
| 6,411,266 B1 | * | 6/2002 | Maguire, Jr. .................. 345/8 |

FOREIGN PATENT DOCUMENTS

| | | |
|---|---|---|
| WO | 9815869 | 4/1998 |
| WO | 9849837 | 11/1998 |

OTHER PUBLICATIONS

David A. Southard "Viewing model for virtual environment displays." Oct. 1995, Journal of Electronic Imaging, pp. 413–420.

* cited by examiner

*Primary Examiner*—Kimbinh T. Nguyen
(74) *Attorney, Agent, or Firm*—Davidson, Davidson & Kappel, LLC

(57) ABSTRACT

A method for displaying a substantially realistic image of an object for a plurality of viewers located in different positions includes defining a particular position in a room for each viewer and generating, based on the position, an image of the object representing the perspective view of the particular viewer.

19 Claims, 4 Drawing Sheets

FT1, P1

Shutter  S1, P1

Shutter  S2, P1

FT2, P2

Shutter  S3, P2

Shutter  S4, P2

METHOD AND DEVICE FOR DISPLAYING A MULTIDIMENSIONAL IMAGE OF AN OBJECT

FIELD OF THE INVENTION

The present invention relates to a method and a device for displaying a multidimensional image of an object, in particular for displaying a three-dimensional image of a virtual object created for a plurality of viewers.

RELATED TECHNOLOGY

To display a multidimensional image of an object, in particular of a virtual object created in a computer, it is customary to employ projection or display devices to project or display the object in the form of a 3D (three-dimensional) image. For this purpose, eyeglasses are used, for example, where the positions of the eyes of the viewer in question are taken into consideration to provide a substantially realistic, perspective view, in such a way that the eyeglasses produce an appropriate image for each eye. This is done, for example, by using projectors having polarization oriented in different directions for the right or left image display. Besides the polarization filter technique, another method employs liquid crystal shutter glasses, referred to as LC shutter glasses or simply shutter glasses. In this method, so-called LC shutters, mounted in the projector or in the glasses, are used to synchronously display the right and the left half image with clock timing control on a projection surface. In the same alternating clock sequence, the shutter glasses release, or uncover, the view of the matching half image. The clock frequency of the switchover between the left and right part of the eyeglass, or the eye of the viewer, of the shutter glass is appropriately defined in order to avoid a so-called flickering effect. A flicker-free perception of the so-called stereoscopic image is achieved at an alternating frequency of about 50 Hz.

Both systems described here (polarization filter or shutter glasses) merely allow a 3D image of a virtual object to be displayed for just one viewer, i.e., for one position in a room. When one or a plurality of observers changes position in a room, the view of the virtual object perceived by the observer(s) in question is altered. The result is that the displayed virtual object does not appear to be fixed in space and, depending on the position, is distorted or compressed.

SUMMARY OF THE INVENTION

An object of the present invention is, therefore, to devise a method for displaying a multidimensional image of an object for a plurality of viewers, which will make it possible for the object to be displayed in a manner that is substantially realistic for a plurality of viewers located in different positions. A further object of the present invention to provide an especially simple device for displaying a multidimensional image of an object for a plurality of viewers.

The present invention provides a method for displaying a multidimensional image of an object for a plurality of viewers, where a particular position in a space is defined for one viewer, and an image of the object representing the perspective view of the viewer in question is generated on the basis of the position. By displaying an image for each individual viewer, in this manner, as a function of position, a plurality of viewers are able to move simultaneously in one environment or space, for example in a room, and, in so doing, perceive the view of the object from their respective position. Thus, the method is characterized by its multi-user capability, making it particularly suitable for team projects where several people need to work simultaneously on one object in the most realistic possible fashion. Moreover, a multi-sided projection of the object is possible.

To generate the image that corresponds to the viewer in question, a plurality of spectral regions is expediently filtered out of a radiation spectrum of an image-display device. In this connection, to produce different images describing the relevant position perspectives, different radiation or emission spectra of the image display device are decoupled. As spectral regions, one preferably decouples narrow-band frequency bands, in particular spectral regions representing the three color receptors. The three color receptors, i.e., the three primary colors, red, green and blue, that can be perceived by the human eye, exhibit an especially high spectral purity.

Due to the high spectral purity of the primary colors, red, green and blue, especially narrow-band and adjacent frequency bands, each being approximately 5 to 20 nm wide, are filtered out for each viewer. The frequency bands for the three primary colors decoupled for each individual viewer, also denoted as frequency triplet, preferably lie within the emission spectrum of the individual color receptors of the human eye. For example, for the colors red, green and blue, the representative frequency bands of 445 to 455 nm, of 515 to 525 nm, and of 605 to 615 nm, respectively, are decoupled for one individual viewer.

To display a substantially realistic, virtual image of the object, two images (referred to in the following as half images) are produced for each viewer, these half images encompassing the image information representing the left and the right eye, respectively. This takes into consideration the two different perspectives of the individual viewer, due to the distance between the eyes.

To separate the half images corresponding to each of the viewer's eyes, as required for three-dimensional perception, different adjacent spectral regions are preferably decoupled from the emission or radiation spectrum of the image display device. Depending on the system specifications, as frequency bands, approximately 5 to 20 nm (also referred to as half-value width) around the corresponding spectral lines for the primary colors are decoupled for a first viewer, for both eyes. This means the colors red, green and blue, for example the frequency bands of 445 to 455 nm, of 515 to 525 nm, and of 605 to 615 nm, respectively, (also denoted as frequency triplet FT1) are decoupled for the left eye, and the frequency bands of 460 to 470 nm, 530 to 540 nm, and of 620 to 630 nm, respectively, are decoupled for the right eye. For the second viewer, the frequency bands are shifted in comparable fashion and decoupled around the spectral lines of, for example, 480, 550 and 635 nm respectively.

In addition or alternatively thereto, the two half images of the viewer in question are displayed with a corresponding clock sequence. The number of viewers can thereby be increased in comparison to the separation method, which separates the images or half images solely on the basis of interference filtering. This can be done for several and for individual viewers, to achieve the positionally-dependent 3D displaying of the object. Moreover, the so-called flickering effect is substantially avoided or suppressed by properly setting the clock frequency, for example, to be greater than 50 Hz, in particular, approximately 160 to 180 Hz.

In an embodiment of the method according to the present invention, for a plurality of viewers, given the same clock sequence, different spectral regions or frequency triplets are decoupled. Alternatively, given a different clock sequence for a plurality of viewers, the same spectral regions or frequency triplets are decoupled. Moreover, to once again increase the number of viewers and simultaneously display the image, polarization filters are additionally used, which are linearly or circularly polarized in variation.

The present invention also provides a device for displaying a multidimensional image of an object for a plurality of viewers, including an image pick-up device, or camera, corresponding to the respective viewer, as well as a measuring device corresponding to the respective viewer, for determining his or her position in the room, and a plurality of image-display devices for displaying an image of the object representing the perspective view of the corresponding viewer, on the basis of the viewer's position. In this manner, the same object can be perceived simultaneously by a plurality of viewers from the perspective view corresponding to the particular viewer in question, substantially realistically and with low distortion. As an image-display device, one uses, for example, a so-called CRT monitor, an LCD panel, a projection display, a laser projector or a plasma display. A pair of glasses is advantageously provided as an image pick-up device for each viewer, in order to display the object in dependence upon the position of the particular viewer and, thus, to display different image information for each viewer.

To separate the half images of the object to be displayed that are specific to each individual viewer, at least two predefinable interference filters can be selected. This means that for each of the viewer's eyes, the spectral regions corresponding so the primary colors red, green and blue, i.e., a frequency triplet, are filtered out as a half image, closely adjacent and, thus, different spectral regions being decoupled as spectral regions for the left eye and for the right eye, respectively. For that reason, the interference filters have an especially narrow-band construction and exhibit a narrow transmittance range for the primary color in question.

As an interference filter, a dielectric filter is preferably provided. This makes it especially simple for an object to be displayed as a 3D image, on the one hand, for each eye and/or for each viewer, separately, together with the corresponding different image information for the viewer position in question.

To increase the number of viewers, a liquid crystal shutter is additionally provided. When LC shutters are used, which are mounted, for example, on the image pick-up device, e.g., the eyeglasses, and, respectively, on the image-display device, e.g., the projector, the so-called flickering effect is largely avoided by elevating the clock frequency.

Various alternative embodiments of the device for two viewers according to the present invention may be provided, as follows:

One embodiment includes, for example, for each frequency triplet, one image-display unit, and, for each viewer, one image pick-up unit, and one measuring device for determining the position of the viewer, to render possible a positionally dependent displaying of a 3D image of an object, as follows:

| viewer 1 | perspective 1 | frequency triplet 1 |
|----------|---------------|---------------------|
|          | perspective 2 | frequency triplet 2 |
| viewer 2 | perspective 3 | frequency triplet 3 |
|          | perspective 4 | frequency triplet 4 |

Another embodiment includes, for example, for each frequency triplet, one image-display unit, and, for each viewer, one image pick-up unit, one shutter, and one measuring device for determining the position of the viewer, to render possible a positionally dependent displaying of a 3D image of an object, as follows:

| viewer 1 | perspective 1 | frequency triplet 1 | shutter open |
|----------|---------------|---------------------|--------------|
|          | perspective 2 | frequency triplet 2 | shutter open |
| viewer 2 | perspective 3 | frequency triplet 1 | shutter closed |
|          | perspective 4 | frequency triplet 2 | shutter closed |

Yet another embodiment includes, for example, for each frequency triplet, one image-display unit, and, for each viewer, one image pick-up unit, one shutter, and one measuring device for determining the position of the viewer, to render possible a positionally dependent displaying of a 3D image of an object, as follows:

| viewer 1 | perspective 1 | frequency triplet 1 | shutter open |
|----------|---------------|---------------------|--------------|
|          | perspective 2 | frequency triplet 1 | shutter closed |
| viewer 2 | perspective 3 | frequency triplet 2 | shutter open |
|          | perspective 4 | frequency triplet 2 | shutter closed |

In each case, perspective 1 and 2, respectively 3 and 4, indicate the eye perspective of the particular viewer 1 or 2; frequency triplets 1 through 4 each indicate frequency bands for the primary colors red, green and blue; the shutter indicates an LC shutter.

In dependence upon the display in a room having a plurality of walls, i.e., multi-sided projection, and in dependence upon the type of device design, for each wall, per viewer, for example, two image-display devices are provided, and, per viewer, one image pick-up device. Alternatively, for each wall, per viewer, one corresponding image-display and image pick-up device are provided. In other words: for each frequency triplet, one corresponding image-display device is provided. By combining interference filtering and the LC shutter technique, one can reduce the number of image-display devices. When working with a device based solely on interference filtering, one image-display device is provided for each frequency triplet. Thus, the number of LC shutters, interference filters, and/or of image-display means can vary depending on the specific embodiment of the device, as well as on the configuration of the room in a closed or open environment. The number of image pick-up devices, e.g., of eyeglasses, preferably corresponds to the number of viewers specified.

To operate the device on-line, e.g., to display the object while allowing for the viewer's movement and, thus, for variation in the perspective view, a sensor for determining position is provided as a measuring device. It sends positional data via a wireless transmission to a computer unit, e.g., to a graphics computer. On the basis of the data, the computer determines the viewer's particular perspective view of the object and, on the basis of the image-display device, generates the corresponding perspective image.

Depending on the type and design, one shared central computer can be provided for all image-display devices. Alternatively, each image-display device can have a corresponding computer. Depending on the type and design, on the basis of the image-display devices, the computer generates the two half images for each viewer or one image for each viewer, in the latter case, the two half images being separated by LC shutters.

By displaying a 3D image of the object as a function of position, the present invention provides the advantage of a plurality of viewers being able to simultaneously and jointly look at the object from different perspectives. In particular, when several people are working together, this method makes it possible for a substantially realistic view of the object to be displayed in the corresponding image, the view representing the particular position of the individual viewer. Visualization of virtually produced objects may be improved over existing systems and is characterized by a low distortion. Moreover, the method and device according to the present invention facilitate a high degree of image separation for the eye perspectives of an individual viewer and/or for the positionally dependent perspectives of a plurality of viewers. So-called ghost images caused by lateral movement of the viewer's head are avoided. In this context, the object may be projected in the form of a 3D image, independently of the projection surface and onto any wall. In particular, given a lateral viewer position with respect to the projection surface, a high degree of image separation is rendered possible.

BRIEF DESCRIPTION OF THE DRAWINGS

The present invention is elaborated upon below on the basis of the drawings, in which.

Equivalent parts are provided with the same reference numerals in a the Figures.

DETAILED DESCRIPTION

Figure 1:
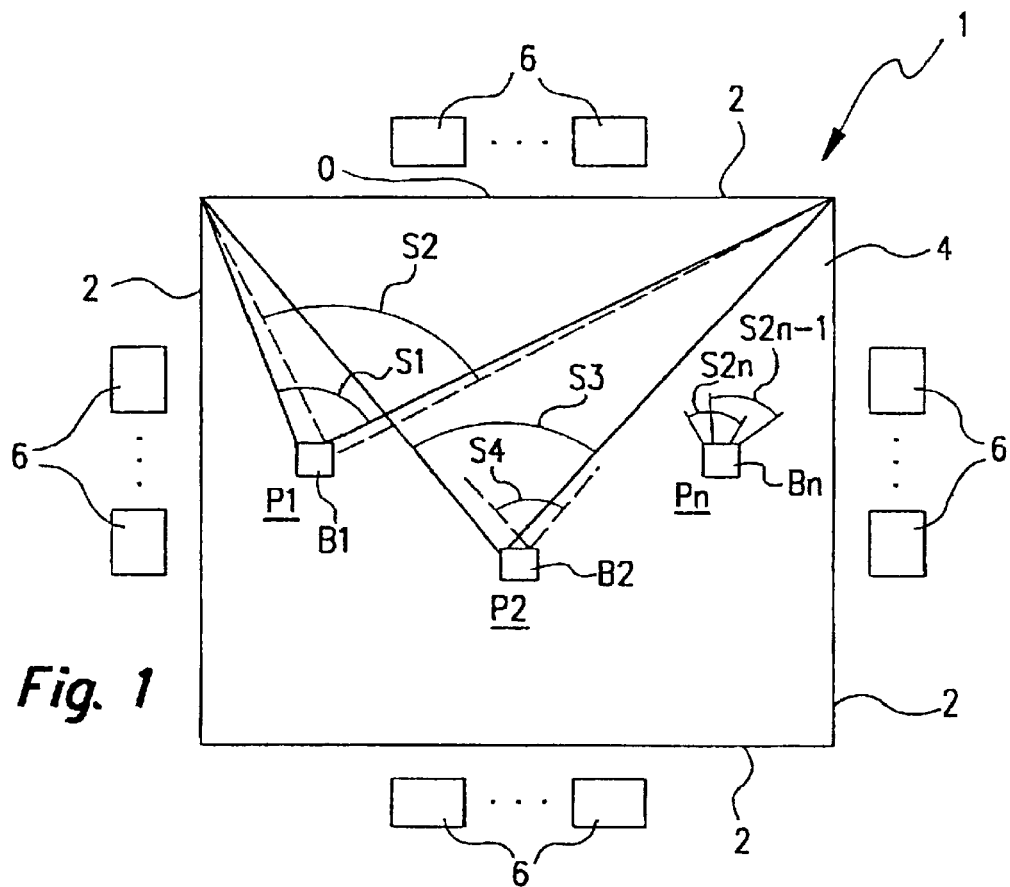
FIG. 1 schematically depicts a device for displaying a multidimensional image of an object for a plurality of viewers.

FIG. 1 depicts a device 1 for displaying a multidimensional image of an object O on a surface 2 for a plurality of viewers B1 through Bn. Surface 2 is, for example, a projection surface in a room 4. Surface 2 can optionally be arranged in an open environment, as well.

With respect to their visual observation of object O on surface 2, viewers B1 through Bn have different respective positions P1 through Pn and, thus, different perspective views $S_{2n-1}$ through $S_{2n}$ of object O. Due to the distance between the eyes of each viewer B1 through Bn, each viewer B1 through Bn has two perspectives $S_1$ and $S_2$, respectively $2_{n-1}$ and $2_n$.

To project object O in the form of an image onto one of surfaces 2 of space 4, a plurality of image-display devices 6 is provided. Depending on their type and design, image-display devices 6 can be mounted in front of or to the rear of surface 2. An LCD display, a plasma display, a laser projector, or a tube projector can be used as image-display device 6, for example.

Figure 2:
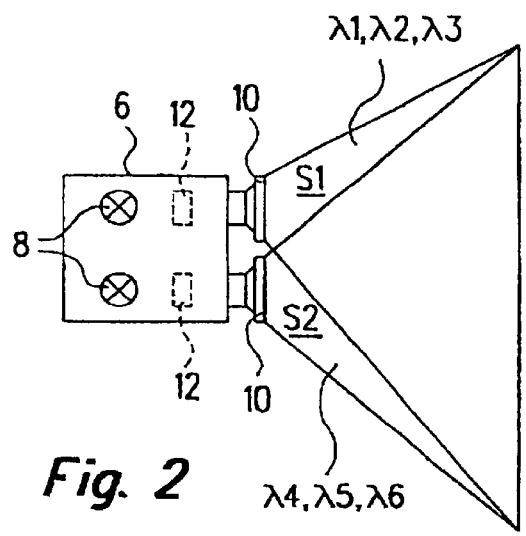
FIG. 2 schematically illustrates an image-display device in accordance with FIG. 1.

An image-display device 6 of this kind is schematically shown in FIG. 2. To produce images for object O for two different perspectives S1 and S2, or S3 and S4, image-display device 6 includes two radiation emitters 8, each having an assigned interference filter 10 for separating the two images for the different perspectives S1 and S2. To generate the image of object O, interference filter 10 filters a plurality of predefinable spectral regions $\lambda 1$ through $\lambda 3$ for perspective S1 and of predefinable spectral regions $\lambda 4$ through $\lambda 6$ for perspective S2, respectively, out of the radiation spectrum of image-display device 6. In the process, different spectral regions $\lambda 1$ through $\lambda 3$ and $\lambda 4$ through $\lambda 6$, respectively, which are closely adjacent in the radiation spectrum, are decoupled for perspectives S1 and S2.

Narrow-band frequency bands of approximately 5 through 20 nm are decoupled out of the radiation or emission spectrum of image-display device 6 as spectral regions $\lambda 1$ through $\lambda 3$ and $\lambda 4$ through $\lambda 6$ for perspectives S1 and S2. The frequency bands may encompass those spectral regions $\lambda 1$ through $\lambda 6$, which lie within the spectral regions for the primary colors, red, green, and blue, which are perceived by the human eye. On the one hand, the two perspectives S1 and S2 can be the different eye perspectives of an individual viewer B1. On the other hand, however, the two different perspectives can be perspectives S1 and S3 of different viewers B1 and B2, respectively.

Besides interference filter 10, image-display device 6 can also have an LC shutter 12, in order to separate the two half images required for one individual viewer B1 through Bn, and/or to separate images required for a plurality of viewers B1 through Bn. In this context, LC shutter 12 in question is alternately opened and closed with a clocking sequence by a synchronization signal to separate the images for the two perspectives S1 and S2.

Figure 3:
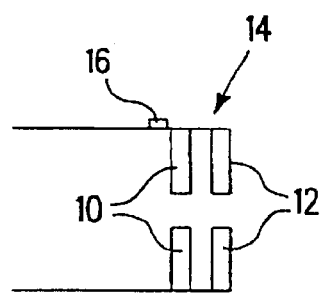
FIG. 3 schematically shows an image pick-up device in accordance with FIG. 1.

Alternatively to image-display device 6 including interference filters 10 and/or LC shutters 12, an image pick-up device 14 as illustrated in FIG. 3 may be provided. For example, a pair of eyeglasses corresponding to the particular viewer B1 through Bn may be provided as image pick-up device 14. To separate the half images of individual viewer B1 through B2, image pick-up device 14 includes interference filter 10. To separate the half images, provision can also be made for LC shutter 12. Depending on the type and requirement, device 1 may have a different kind of design.

This means that image pick-up device 14 and/or image-display device 10 may include only interference filters 10, or a combination of interference filters 10 and LC shutters 12, or a combination of interference filters 10, LC shutters 12, and polarization filters (not shown). If a laser projector is provided, for example, as image-display device 6, interference filters 10 are included only in the image pick-up device 14 of any one viewer B1 through Bn. Interference filters 10 for image-display device 6 then need not be provided.

To determine the position of the particular viewer B1 through Bn, the respective image pick-up device 14 has a measuring device 16, which communicates the data on the position of viewer B1 through Bn to a computer (not shown), e.g., via wireless transmission.

Figure 4:
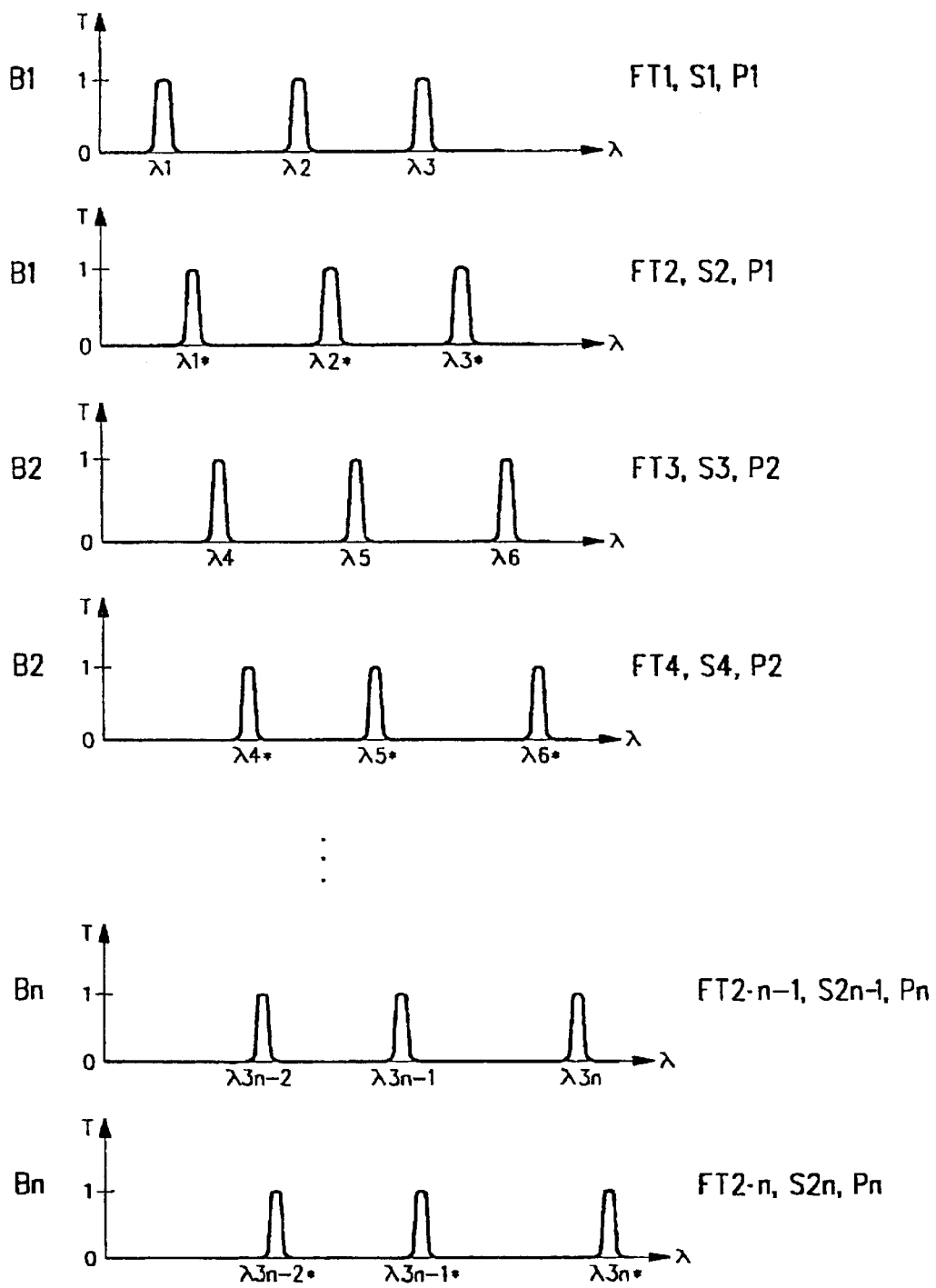
FIG. 4 shows three pairs of spectral region graphs for an embodiment of a device for displaying a multidimensional image of an object for a plurality of viewers, each pair of graphs corresponding to two perspectives for a respective viewer B1, B2, . . . Bn.
Figure 5:
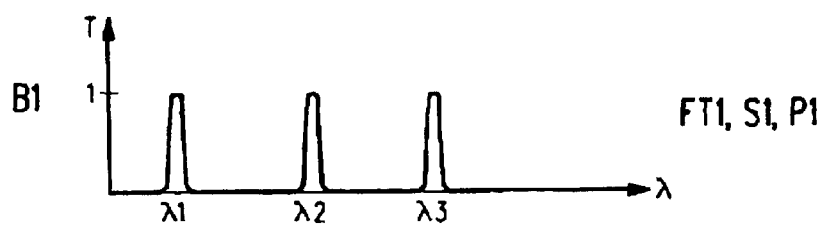
FIG. 5 shows two sets of three graphs for another embodiment of a device for displaying a multidimensional image of an object for a plurality of viewers, each set of graphs including two spectral region graphs corresponding to two perspectives and one LC shutter position versus time graph for each respective viewer B1 and B2.
Figure 5:
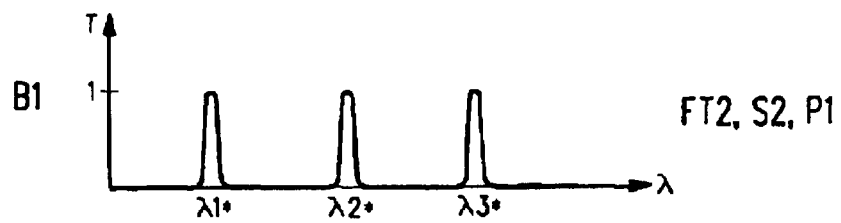
Figure 5:
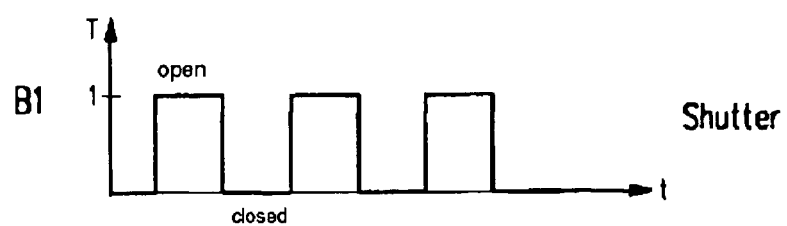
Figure 5:
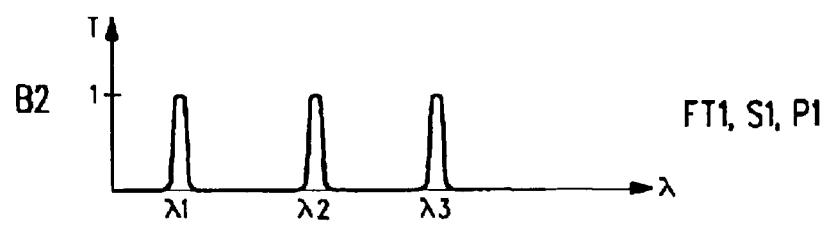
Figure 5:
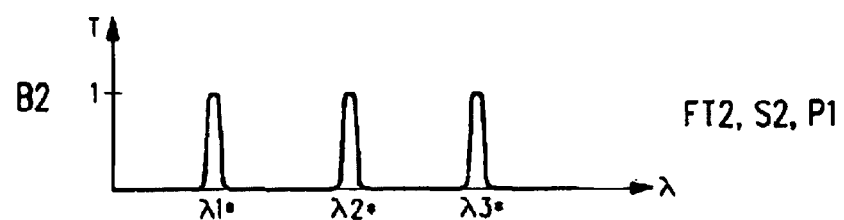
Figure 5:
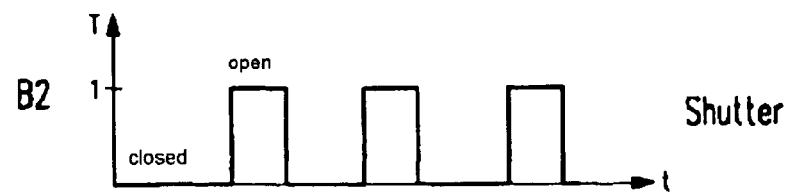
Figure 6:
FIG. 6 shows two sets of three graphs for yet another embodiment of a device for displaying a multidimensional image of an object for a plurality of viewers, each set of graphs including a spectral region graph and two LC shutter position versus time graphs corresponding to two perspectives for each respective viewer B1 and Bb2.
Figure 6:
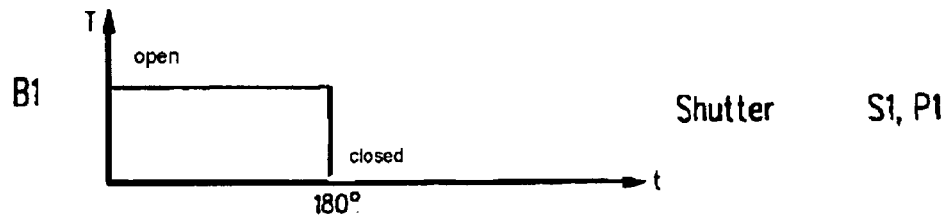
Figure 6:
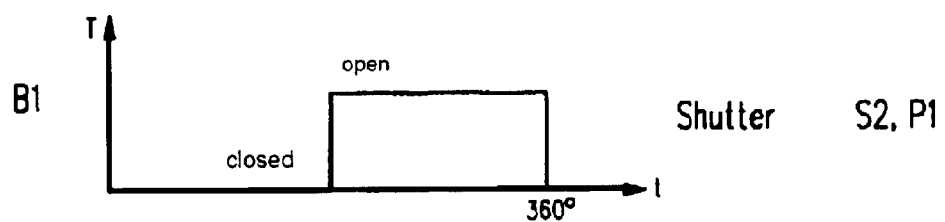
Figure 6:
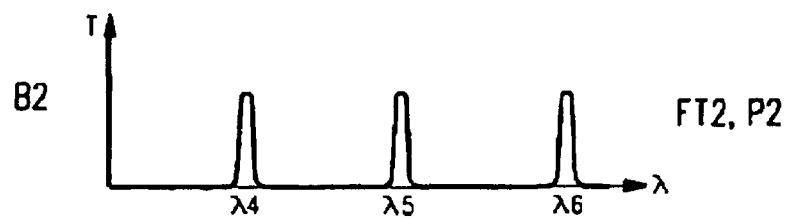
Figure 6:
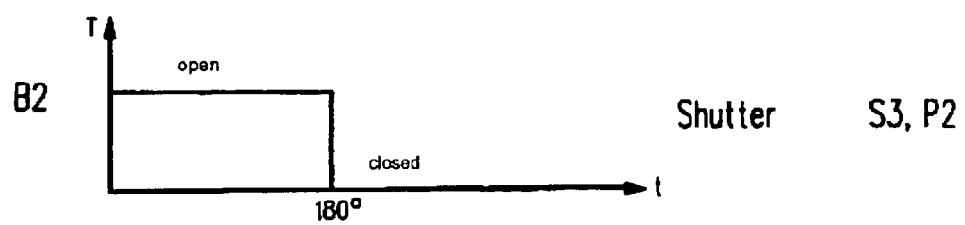
Figure 6:
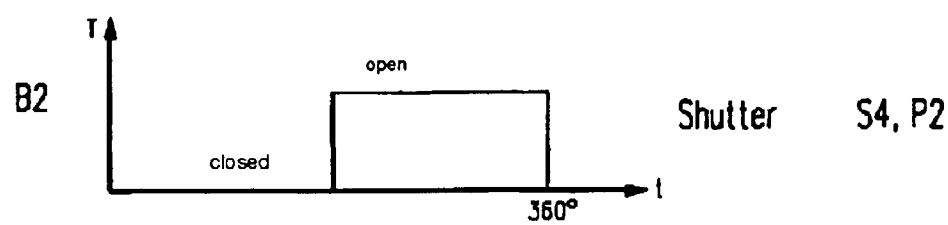

FIGS. 4 through 6 show various possibilities according to embodiments of the present invention for decoupling and separating the images of a plurality of viewers B1 through Bn, as well as of the half images of the individual viewer B1 through Bn in question.

FIG. 4 depicts an embodiment where, for a plurality of viewers B1 through Bn having various positions P1 through Pn and, therefore, different perspectives S1 through $S_{2n}$, device 1 includes interference filters 10 for separating the individual images, different spectral regions $\lambda 1$ through $\lambda 3n*$ being filtered out in each case. Two perspectives S1 and S2, S3 and S4 or $S_{2n-1}$ and $S_{2n}$ each are provided for each individual viewer B1, B2 through Bn, respectively, as a function of his or her eye distance, by decoupling a corresponding frequency triplet FT1 and FT2, FT3 and FT4, or $FT_{2n-1}$ and $FT_{2n}$, respectively, and displayed on the basis of image-display device 6 in the form of a corresponding image for object O on surface 2.

Three frequency bands encompassing the spectral lines for the primary colors, red, green, and blue, are decoupled as frequency triplets FT1 through FT2 from the radiation spectrum of image-display device 6. For example, frequency bands 445 through 455 nm (blue color), 515 through 525 nm (green color), and 605 through 615 nm (red color) are decoupled as frequency triplet FT1 for the left eye and, thus, for perspective S1 of viewer 1. For the right eye, comparably adjacent or shifted spectral regions $\lambda 1$ through $\lambda 3*$ and, thus, frequency triplet FT2 having the frequency bands 460 through 470 nm (blue color), 530 through 540 nm (green color), and 620 through 630 nm (red color) are decoupled. Frequency triplets FT3 and FT4, likewise slightly shifted by one frequency range, are used analogously for viewer 2. Such a slight shift in the individual frequency bands of frequency triplets FT1 through FT4, due to the narrowband quality, ensures that the particular intended primary color is filtered out for all viewers B1 through Bn. Through spectral regions $\lambda 1$ through $\lambda 3n*$ filtered by interference filters 10, viewer B1 through Bn in question picks up the half image corresponding to each eye stereoscopically and the position-specific image for object O with both eyes.

An alternative embodiment is shown in FIG. 5, where for a plurality of viewers B1 through Bn (shown by way of example for two viewers) having various positions P1 through Pn and, therefore, different perspectives S1 through $S_{2n}$, device 1 includes both interference filters 10 and LC shutters 12 for separating the individual images and/or half images. In this context, different frequency triplets FT1 and FT2 are filtered out as spectral regions $\lambda 1$ through $\lambda 3$ and $\lambda 1*$ through $\lambda 3*$, respectively, for each of the two eye perspectives S1 and S2 and, respectively, S3 and S4, corresponding to each of the two viewers B1 and B2. To separate the half images of the particular eye perspective S1 and S2 and, respectively, S3 and S4, the different frequency triplets FT1 and FT2 are decoupled by interference filters 10 for each viewer B1 and B2. To separate the images of the two viewers B1 and B2, LC shutters 12 are provided, which are synchronized in variation for the particular viewer B1 and B2. This means that when LC shutter 12 is open for viewer B1, LC shutter 12 is closed for viewer B2.

FIG. 6 depicts yet another embodiment where, for a plurality of viewers B1 through Bn (shown by way of example for two viewers B1 and B2) having various positions P1 through Pn and, therefore, different perspectives S1 through $S_{2n}$, device 1 includes both interference filters 10 and LC shutters 12 for separating the individual images and/or half images. In this context, for each of the two eye perspectives S1 and S2, and S3 and S4, respectively, corresponding to each of the two viewers B1 and B2, the same frequency triplets FT1 and FT2, respectively, are used by decoupling spectral regions $\lambda 1$ through $\lambda 3$ and $\lambda 1*$ through $\lambda 3*$, respectively, by interference filters 10. To separate the particular eye perspectives S1 and S2, and S3 and S4, respectively, for each viewer B1 and B2, LC shutters 12 are provided, which are synchronized in variation for the particular eye perspective S1 and S2, and S3 and S4, respectively. This means that when LC shutter 12 is open for perspective S1 of viewer B1, then LC shutter 12 is closed for perspective S2 of viewer B1. To separate the images of the two viewers B1 and B2, the various, closely adjacent spectral regions $\lambda 1$ through $\lambda 3$ and $\lambda 4$ through $\lambda 6$, respectively, are decoupled by interference filters 10.

Depending on the type and number of viewers B1 through Bn, device 1 may additionally include polarization filters for separating the various images.

During operation of device 1, positions P1 through Pn of viewers B1 through Bn, respectively, determined by the respective measuring devices 16, are used to determine the various perspectives S1 through $S_{2n}$. On the basis of the ascertained perspectives S1 through $S_{2n}$, an image of object O representing the particular perspective S1 through $S_{2n}$ is then generated on surface 2. To separate the various images, provision is made for a proportionate number of interference filters 10 and image pick-up devices 14, as well as of image-display devices 6.

To increase the number of viewers B1 through Bn and, thus, to increase the number of various perspective images, additional LC shutters 12 can be provided. To synchronize LC shutters 12, a central or local computer unit (not shown) is preferably provided. The number of viewers B1 through Bn can be further increased by using polarization filters to separate the images.

Very high selectively may be attained by using interference filters 10 to separate the images. In particular, a selective perception is achieved for viewers B1 through Bn due to the especially narrow-band transmittance in the case of primary color wavelengths. Daylight, with its continuous spectrum, is largely filtered out and, thus, suppressed, since interference filters 10 are only transmissive for the narrow spectral regions $\lambda 1$ through $\lambda 2_n$ of the three primary colors.

What is claimed is:

1. A method for displaying a multidimensional image of an object for a plurality of viewers, the method comprising:
    defining a respective position in a space for each of the plurality of viewers; and
    generating a respective image of the object representing a respective perspective view for each of the plurality of viewers using the respective position, wherein the respective image is generated by filtering a respective plurality of spectral regions out of a radiation spectrum of an image-display device, wherein the filtering is performed by decoupling respective narrowband frequency bands.

2. The method as recited in claim 1 wherein the narrow frequency bands are each approximately 5 to 20 nm wide.

3. The method as recited in claim 1 wherein each of the respective image includes two respective half-images.

4. The method as recited in claim 3 wherein the generating the respective image for each of the plurality of viewers is performed by generating a respective plurality of spectral regions, each respective plurality of spectral regions including respective first and second adjacent spectral regions, and further comprising decoupling each of the respective first and second adjacent spectral regions so as to form each of the two respective half-images.

5. The method as recited in claim 3 further comprising displaying each of the respective two half-images according to a respective clock sequence.

6. The method as recited in claim 4 further comprising displaying each of the respective two half-images according to a respective clock sequence.

7. The method as recited in claim 5 wherein the generating the respective image for each of the plurality of viewers is performed by generating a respective plurality of spectral regions, and wherein each of the respective clock sequence is the same, and further comprising decoupling each of the respective plurality of spectral regions.

8. The method as recited in claim 6 wherein each of the respective clock sequence is the same.

9. The method as recited in claim 5 wherein the generating the respective image for each of the plurality of viewers is performed by generating a respective plurality of spectral regions, and wherein each of the respective clock sequence is different, and further comprising decoupling each of the respective plurality of spectral.

10. The method as recited in claim 6 wherein each of the respective clock sequence is different and further comprising decoupling each of the respective plurality of spectral regions.

11. The method as recited in claim 1 wherein the space is a room.

12. The method as recited in claim 1 further comprising polarization filtering the respective image.

13. A device for displaying a multidimensional image of an object for a plurality of viewers, the device comprising:
  a respective image pick-up device associated with each of the plurality of viewers;
  a respective measuring device associated with each of the plurality of viewers for determining a respective position of the respective viewer in a space;
  a plurality of image-display devices for displaying a respective image of the object representing a respective perspective view of each of the plurality of viewers using the respective position of the respective viewer; and
  at least one interference filter configured to filter a respective plurality of spectral regions out of a radiation spectrum foe defining each respective image.

14. The device as recited in claim 13 each of the respective image pick-up device includes a respective pair of eyeglasses.

15. The device as recited in claim 13 further comprising a respective liquid crystal shutter associated with each of the plurality of viewers.

16. The device as recited in claim 13 wherein the space is a room.

17. A filtering apparatus for use with a device for displaying a multidimensional image of an object for a plurality of viewers, the filtering apparatus comprising:
  a filter configured to generate a respective image of the object representing a perspective view for one of the plurality of viewers by filtering a plurality of predefinable spectral regions out of a radiation spectrum of an image-display device, wherein the filter is configured to decouple narrow frequency bands.

18. The filtering apparatus as recited in claim 17 wherein the narrow frequency bands are each approximately 5 to 20 nm wide.

19. A method for displaying a multidimensional image of an object for a plurality of viewers, the method comprising:
  defining a respective position in a space for each of the plurality of viewers; and
  generating a respective image including two respective half images of the object representing a respective perspective view for each of the plurality of viewers using the respective position, wherein the respective image is generated by generating a respective plurality of spectral regions, each respective plurality of spectral regions including respective first and second adjacent spectral regions, and further comprising decoupling each of the respective first and second adjacent spectral regions so as to form each of the two respective half-images.

* * * * *